United States Patent [19]

Matthews

[11] Patent Number: 5,419,521

[45] Date of Patent: May 30, 1995

[54] THREE-AXIS PEDESTAL

[76] Inventor: Robert J. Matthews, 2640 Caballo Ranchero Dr., Diablo, Calif. 94528

[21] Appl. No.: 46,757

[22] Filed: Apr. 15, 1993

[51] Int. Cl.$^6$ .................. H01Q 3/00; F16M 11/12
[52] U.S. Cl. .................... 248/278; 248/661; 248/179; 343/765; 343/882
[58] Field of Search .............. 343/765, 766, 709, 757, 343/882, ; 342/359; 248/183, 278, 184, 179, 661, 652, 664; 403/53, 57

[56] References Cited

U.S. PATENT DOCUMENTS

| | | | |
|---|---|---|---|
| 2,605,418 | 7/1952 | Grass | 343/765 |
| 3,510,877 | 5/1970 | Turriere | 343/882 |
| 4,490,724 | 12/1984 | Brickman | 343/765 |
| 4,697,772 | 10/1987 | Kosugi et al. | 248/183 |
| 5,227,806 | 7/1993 | Eguchi | 343/766 |

FOREIGN PATENT DOCUMENTS

| | | | |
|---|---|---|---|
| 2538878 | 7/1984 | France | 248/183 |
| 3739546 | 6/1989 | Germany | 248/183 |

Primary Examiner—Donald Hajec
Assistant Examiner—Tan Ho
Attorney, Agent, or Firm—Burns, Doane, Swecker & Mathis

[57] ABSTRACT

A three-axis stabilized platform is disclosed wherein the azimuth, or train axis, a cross-level axis and an elevation axis intersect each other at a substantially common pivot point. Each axis supports a pivotable member which includes sensing and drive means for correcting the position of that member to maintain the direction of an antenna toward an aiming point in space. Azimuth post rotates or pivots about the azimuth or train axis and is cantilevered from a support base so that the post extends vertically and radially inwardly from the base to provide pivot supports at its outer end and in planes perpendicular to each other and perpendicular to the plane of the azimuth axis. Such an arrangement permits corrective signals to be generated in the plane of motion of each pivot axis so as to maintain the antenna in alignment with a satellite, without calculation of spacial transformations to calculate each angular coordinate required to compensate for each deviation of the antenna from the desired aiming point.

11 Claims, 6 Drawing Sheets

THREE-AXIS PEDESTAL

BACKGROUND OF THE INVENTION

The present invention relates to antenna pedestals and particularly to satellite tracking antenna pedestals used on ships and other mobile applications.

The invention is especially suitable for use aboard ship wherein an antenna is operated to track a transmitting station, such as a communications satellite, notwithstanding roll, pitch, yaw, and turn motions of a ship at sea.

Antennas used in shipboard satellite communication terminals typically are highly directive. For such antennas to operate effectively they must be pointed continuously and accurately in the direction toward the satellite.

When a ship changes its geographical position, or when the satellite changes its position in orbit, and when the ship rolls, pitches, yaws and turns, an antenna mounted on the ship will tend to become mis-pointed. In addition to these pointing disturbances the antenna will be subjected to other environmental stresses such as vibrations caused by shipboard machinery and shocks caused by wave pounding. All of these effects must be compensated for so that accurate antenna pointing can be maintained. Various stabilizing and motion-compensating antenna pedestals have been described in prior art (see U.S. Pat. Nos. 3,999,184, 3,358,285, 4,582,291, 3,893,123 and 3,860,931), however all of them suffer from one or more of the following disadvantages or deficiencies:

Limited ship motion accommodation
Inadequate vibration and shock tolerance
Poor pointing accuracy
Excessive size and weight
High cost
Poor reliability
Difficult maintenance Compactness in size and lightness in weight are of paramount importance for antenna pedestals used on ships. Small ships and boats which operate in rough seas routinely experience roll amplitudes of ±35 degrees or more, pitch amplitudes of ±15 degrees, and repetitive wave pounding shocks of 2 g's. Antenna pedestals which are compact, and light yet rugged, which accommodate such effects and which avoid all of the above-listed disadvantages or deficiencies have not previously been available. Accordingly, it is a principle object of the present invention to provide an improved antenna pedestal apparatus wherein the foregoing deficiencies or disadvantages are substantially eliminated.

It is a primary object of the present invention to provide an improved stabilized antenna pedestal which occupies a minimum of space while accommodating very large amplitude ship motions.

It is a further object of the present invention to provide an improved shipboard antenna pedestal for use in a system for accurately tracking a satellite from ships in spite of elastic structural distortions (hull flexure) caused by rough seas.

It is a still further object of the present invention to provide an improved maritime satellite tracking antenna pedestal apparatus which provides accurate pointing, is reliable in operation, is easily maintained, uncomplicated, and economical to fabricate.

It is a still further object of the present invention to provide an improved stabilized antenna pedestal which is capable of rotational or tilting motions about a plurality of axes without requiting application of high driving torques.

It is a still further object of the present invention to provide an improved stabilized antenna pedestal which is substantially rigid and strong so as to be capable of withstanding moments, pressures, vibration, shock, and other forces when disposed in operational relationship with a ship at sea, as on the mast of the ship, and yet is light in weight.

SUMMARY OF THE INVENTION

Briefly described, the stabilized antenna pedestal embodying the invention is mounted on and extends upwardly from a mounting surface such as on a platform attached to a ship's mast or on top of a wheelhouse roof. The pedestal includes a plurality of axes and structural members which support an antenna and which, through drive means responsive to control signals, stabilizes the antenna for pitch, roll, and yaw/turning motions of the ship, and which continuously points the antenna in any desired direction.

A first axis, hereinafter referred to as the train axis, is defined by a spindle rigidly attached to the ship's structure (or mast) and oriented with its axis perpendicular to the ship's deck. Pivoting on this base spindle is a stiff upwardly curved beam, hereinafter referred to as the azimuth post. The azimuth post is curved so that it extends radially outwardly from the base spindle and then upwardly and radially inwardly to form a cantilevered support means for other portions of the pedestal. The upper end of said azimuth post then carries a pair of bearings, the centerlines of which define a second axis parallel to the ship's deck. The second axis intersects, or is close to intersecting, said first, or train, axis, about which the azimuth post pivots or rotates, preferably through 360° of movement. The second axis is referred to as the cross-level axis. Concentric with the cross-level axis is a shaft carried by the cross-level pair of bearings to which is attached a stiff, straight beam (the level beam) the longitudinal axis of which defines two co-linear axes, hereinafter referred to as the level platform axis and the elevation axis. The centerline of spindles mounted in each end of the level beam define the elevation axis. Mounted on these spindles are bearings carried by two elevation pans which themselves are rigidly attached to the antenna.

In its simplest form the present invention consists mainly of the structure, journals and spindles, plus drive means for positioning the various pivoting members, which comprise the three-axis pedestal described above. In this form antenna stabilization is achieved by applying drive means to each respective axis member, said drive means being responsive to external stabilizing control signals. The three axes in the pedestal are so arranged that mathematical coordinate transformations are not required in controlling the position of the antenna in conventional elevation and train coordinates. Elimination of coordinate transformation signal processing avoids an important source of pointing errors inherent in prior two-axis and three-axis pedestals.

A particular disadvantage of prior two- and three-axis pedestals is the need to make coordinate transformations between the set of coordinates used as references for antenna stabilization and pointing and the pedestal motion axes. To understand this situation consider first a two-axis elevation-over-train pedestal.

When the ship is not in motion, as when it is in port, antenna pointing in train and elevation coordinates is simple. But when underway the ship rolls or pitches, causing the antenna to point in an undesired direction, and corrections of the train and elevation pointing angles are required. Each of the new pointing commands requires solution of a complicated three-dimensional vector problem involving angles of ship's heading, roll, pitch, train, and elevation.

Consider next an elevation-over-train-over-roll three-axis pedestal. Again, when the ship is motionless antenna pointing in elevation and train coordinates is simple. If the ship experiences roll motion only, an unlikely situation, then antenna pointing remains simple. For the general case, however, components of roll, pitch and yaw angles all affect antenna pointing direction. An equivalent three-dimensional vector problem, similar to that described above, then exists and requires solution. Similar difficulties are inherent in other three-axis pedestals, such as an elevation-over-canted-cross-level-over-train pedestal. Eliminating the need to solve three-dimensional vector problems, by use of the arrangement of the present invention, results in simpler and more accurate antenna pointing.

In a more complex form the present invention includes a level platform which is supported by bearings and spindle, concentric with or parallel to the elevation axis. This platform provides support means for tilt sensors, accelerometers, angular rate sensors, Earth's magnetic field sensor, and other instruments useful for generating pedestal stabilizing control signals. Description of means by which such sensors and instruments can be used to obtain pedestal stabilization and antenna position control is not within the scope of the present invention. Detailed information on such means, however, can be found in U.S. Pat. No. 3,999,184 (Fuss), in patent application Ser. No. 598,492 (Joseph Grapham Mobley), in U.S. Pat. Nos. 3,638,502 (Leavitt et at) and 2,924,824 (Lanctot et al) and in other technical literature. The text of such patents is incorporated in this application by reference thereto.

The basic three-axis pedestal comprising this invention can be considered as consisting of only four main structural members: 1. a deck mounted base spindle, 2. an upwardly curved cantilever beam (azimuth post), 3. a level beam, and 4. elevation axis spindles with intermediate structural members and attached antenna. Each of these members is designed to be exceedingly stiff and strong so as to survive the severe shipboard environment. Toward this end these members are fabricated in the form of large hollow aluminum castings, tubular extrusions, or stiffened plates. Glass fiber or other composite materials can also be used for these structural elements. Notwithstanding their robust nature these members are light in weight as a result of the compact arrangement of the invention.

To minimize drive torque requirements, each of the pivoting members in the pedestal is counterbalanced to obtain static balance about its pivot axis. Thus, the antenna with its intermediate support members is statically balanced about the elevation axis, the level platform assembly is statically balanced about its axis, the level beam assembly is statically balanced about the cross-level axis, and the azimuth post is statically balanced about the train axis. This static balancing removes from the pedestal virtually all disturbing torques caused by heave, surge, sway, and by tangential accelerations resulting from roll and pitch ship motions. Also, the axis arrangement results in elimination of most inertia loads from the pedestal drive means. This characteristic is in marked contrast to all previously disclosed two- and three-axis stabilized pedestal systems. In those systems when ship motions occur the mass moment of inertia of the various pedestal members must be accelerated in inertial space to keep the antenna correctly pointed. Under certain combinations of antenna position and ship roll, pitch and yaw/turning motions the torques required to accelerate and decelerate the various members in those types of pedestals can be very high. High torque (heavy) motors are therefore required to drive each pivotable element of the pedestal. In contrast, much smaller and lighter (relatively) drive means are used in the present invention.

The foregoing and other objects and advantages of the present invention will become more apparent from the reading of the following description of the preferred embodiment of the invention which is set forth hereinafter and shown in the accompanying drawings.

BRIEF DESCRIPTION OF THE DRAWINGS

FIGS. 7A, 7B, and 7C show three views of the level platform assembly shown in FIG. 3, wherein;

DESCRIPTION OF THE PREFERRED EMBODIMENTS

Figure 1:
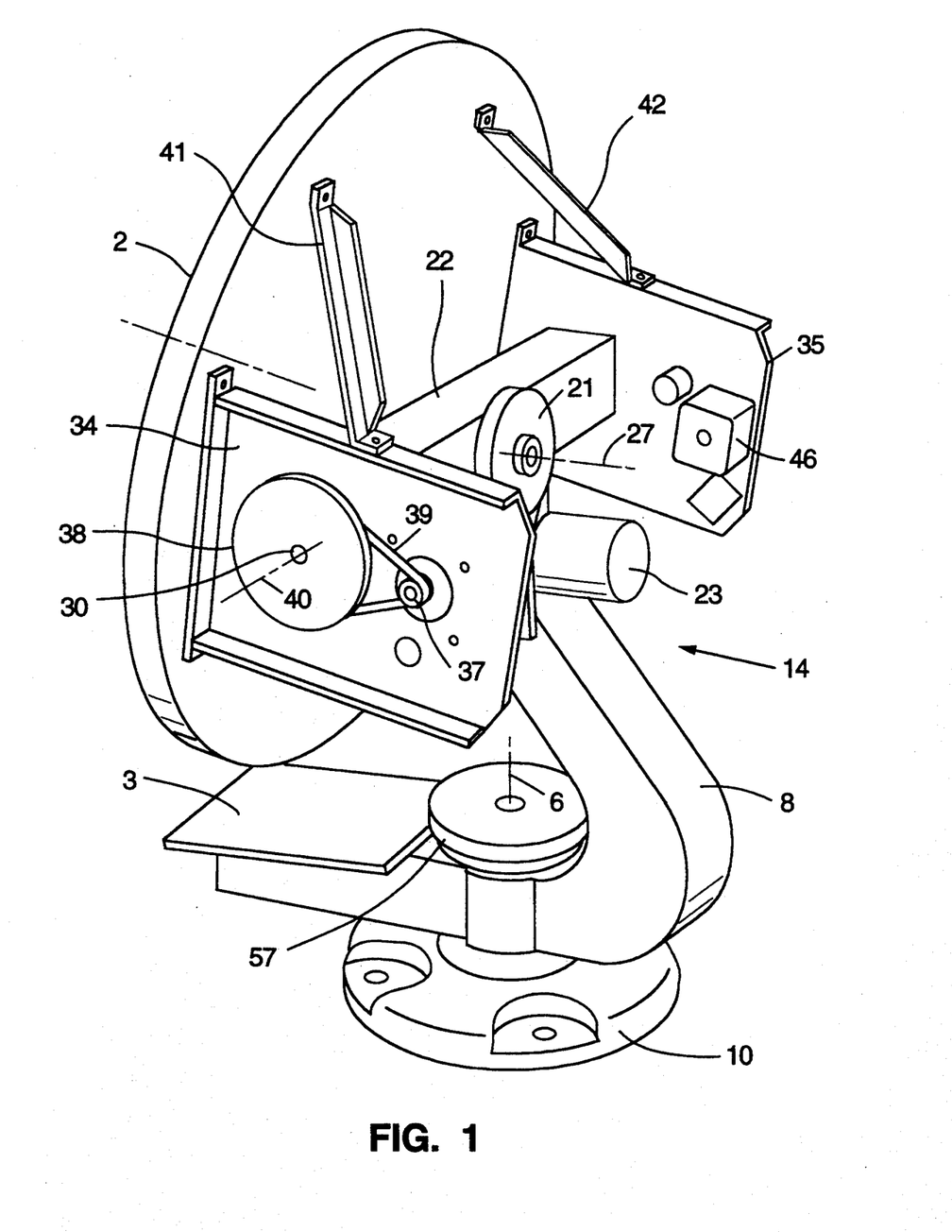
FIG. 1 is a left-side perspective view of a maritime satellite tracking apparatus embodying the invention.
Figure 2:
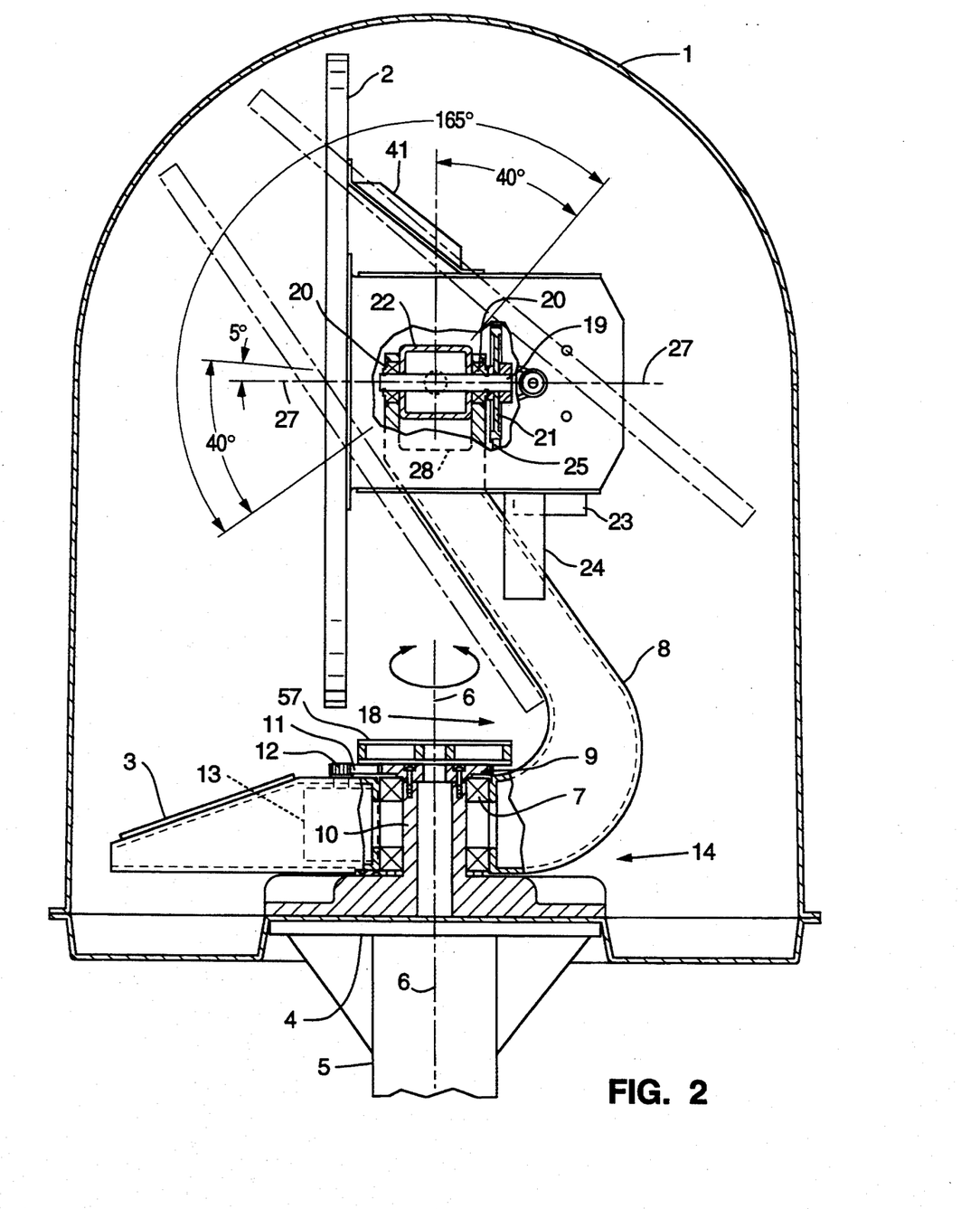
FIG. 2 is a side elevation view of the apparatus shown in FIG. 1; illustrating the mounting of the pedestal within a cross-section of a radome having a hemispherical structure.

Referring first to FIG. 1 there is shown a satellite communications antenna 2 fitted to a three-axis pedestal 14 adapted to be mounted on top of a mast of a vessel having a satellite communication terminal. Omitted from FIG. 1, but shown in FIG. 2, is radome 1 normally used in conjunction with such apparatus. The terminal contains communications equipment and other equipment for commanding the antenna to point toward the satellite in elevation and azimuth coordinates. Operating on the pedestal in addition to those antenna pointing commands is a servo-type stabilization control system which is integrated with pedestal assembly 14. The servo control system, through its sensors and electronic signal processor and motor controller 3, automatically maintains level beam 22 horizontal, level platform 45 (shown in FIG. 3) level, and antenna 2 elevation and azimuth angles at their commanded positions. How these functions are accomplished is beyond the scope of the present description. It is sufficient here to note that the servo stabilization control system provides means for actuating pedestal drive motors 13, 23, 36, and 46 to accomplish these results.

Figure 3:
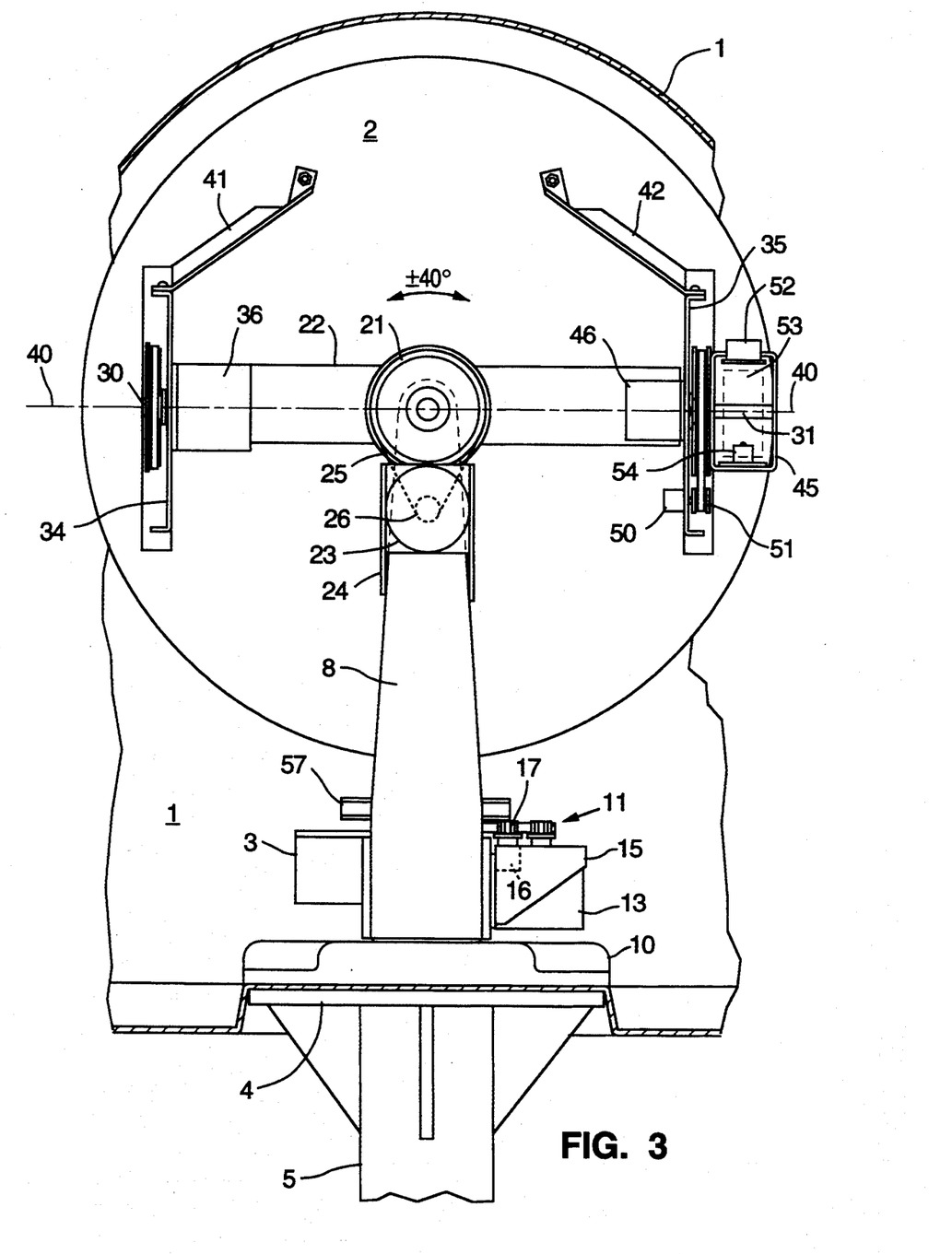
FIG. 3 is a rear elevation view of the apparatus shown in FIG. 1.

Referring to FIG. 2, pedestal base spindle 10 is attached to mounting pad 4 on ship's mast 5. Pivotally mounted on base spindle 10 for rotation about train axis 6 by means of train bearings 7 is azimuth post 8. Rigidly attached to the top of base spindle 10 is train driven pulley 9 which meshes with train drive belt 11 which in turn meshes with drive pulley 12 on train motor 13. Referring now also to FIG. 3, train motor bracket 15 supports both train motor 13 and train position encoder 16 with pulley 17 which also meshes with drive belt 11. Mounted on top of driven pulley 12 is a cable spool assembly 57 useful for winding up wires and cables carried through base spindle 10. Alternatively, a coaxial rotary joint, not shown, can be installed in base spindle 10 to provide a convenient method for carrying communication signals, antenna stabilization and position command and status information, and electrical power, all of which are multiplexed on a single coaxial cable, across train axis 6. With this arrangement pedestal 14 can accommodate unlimited ship turning maneuvers.

Figure 4:
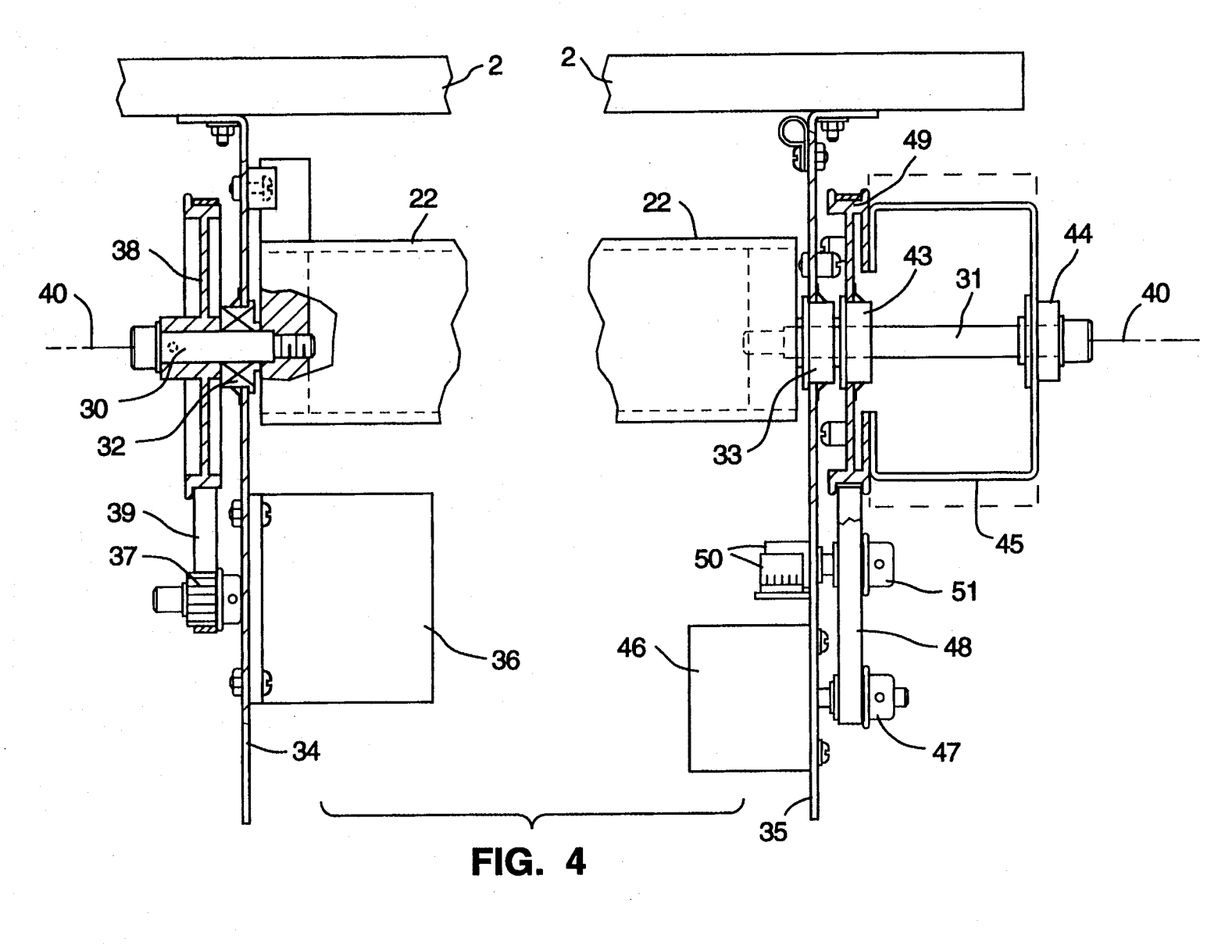
FIG. 4 shows construction details of the elevation spindle arrangement shown in FIG. 3.

Still referring to FIG. 2, azimuth post 8 is seen to curve first away from and then upward and back toward train axis 6. The clearance space 18 thus created allows antenna 2 to remain oriented toward any elevation angle above the horizon without interference when base spindle 10 and azimuth post 8 move with the ship as it rolls or pitches. Cross-level shaft 19 is supported by cross-level bearings 20 mounted at the top of azimuth post 8, the centerline of which defines cross-level axis 27. Rigidly attached to shaft 19 is cross-level driven pulley 21 and level beam 22. Referring now also to FIG. 3, cross-level drive motor 23 is supported by cross-level motor bracket 24 which is attached to azimuth post 8. Cross-level drive belt 25 meshes with cross-level drive pulley 26 and driven pulley 21. Notch 28 between bearing 20 (shown only in FIG. 2) provides space for level beam 22 to remain clear of interference when azimuth post 8 moves with the ship as it rolls or pitches as indicated in FIG. 3. FIGS. 3 and 4 indicate roll and pitch operating ranges of ±40 degrees, but operating ranges of at least ±50 degrees are achievable by making suitable dimensional changes to azimuth post 8 and level beam 22. As a matter of practicality, few ships or boats ever experience roll motions in excess of ±40 degrees or pitch motions in excess of ±15 degrees.

The embodiment of the invention shown in FIGS. 2 and 3 indicates that pedestal 14 fitted with an 18 inch diameter flat-plate type antenna can accommodate roll and pitch motions of ±40 degrees with the entire assembly housed in a radome which is only 19½ inches in diameter. Radome 1 is thus only 9 percent larger than antenna 2, which constitutes a very small and desirable form factor. Form factor is here defined as the ratio of swept diameter about the train axis to antenna diameter.

Figure 5:
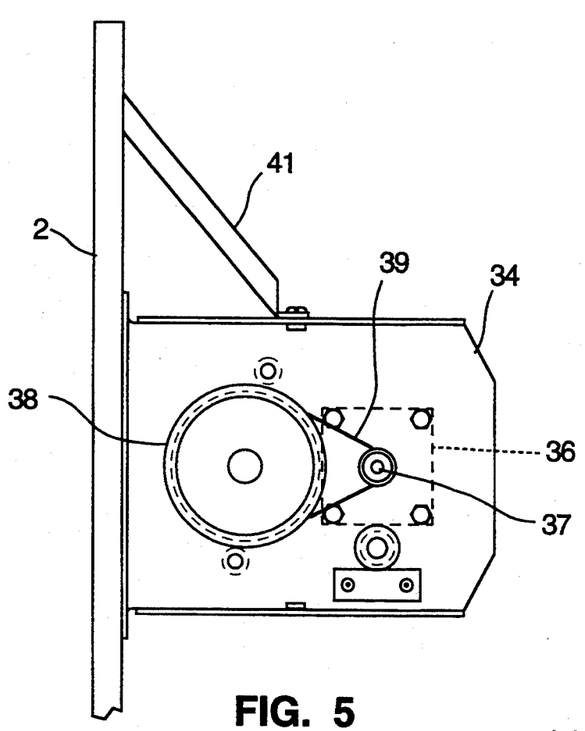
FIG. 5 is a side view of the left elevation pan shown in FIG. 4.
Figure 6:
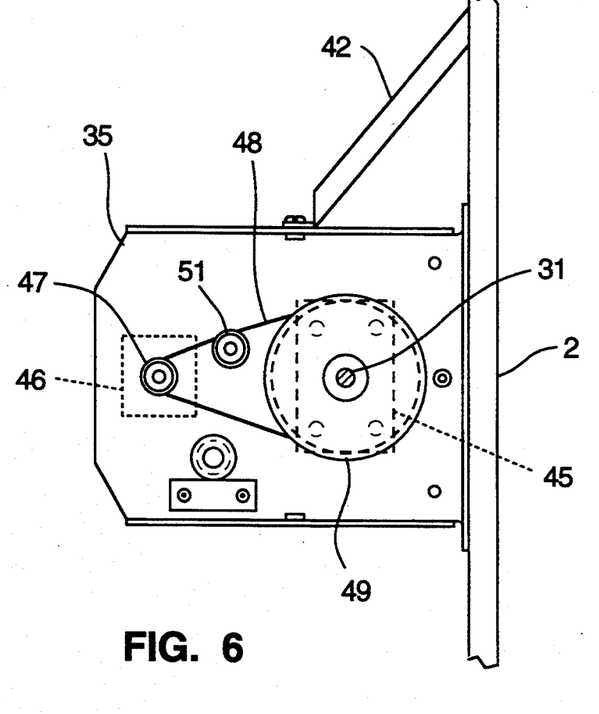
FIG. 6 is a side view of the right elevation pan shown in FIG. 4.

Referring to FIG. 4, elevation spindle 30 and level platform spindle 31 are seen to be mounted in the ends of level beam 22. Centerlines of spindles 30 and 31 define elevation axis 40. Elevation bearings 32 and 33 carry left elevation pan 34 and right elevation pan 35 respectively. Referring now also to FIGS. 5 and 6, elevation drive motor 36 is mounted in left elevation pan 34 and through elevation drive pulley 37, elevation drive belt 39, and elevation driven pulley 38 provides means for rotating elevation pan 34 about elevation axis 40. Elevation driven pulley 38 is rigidly attached to elevation spindle 30 which in turn is rigidly attached to level beam 22. Antenna 2 is rigidly attached to left and right elevation pans 34 and 35 and to antenna struts 41 and 42. Pivotally mounted on level platform spindle 31 by means of bearings 43 and 44 is level platform 45. Level platform motor 46 is rigidly mounted in fight elevation pan 35 and through drive pulley 47, drive belt 48, and driven pulley 49 provides means for pivoting level platform 45 about spindle 31. Also rigidly attached to right elevation pan 35 is elevation position encoder 50 which carries pulley 51 which meshes with and is driven by drive belt 48.

Figure 7A:
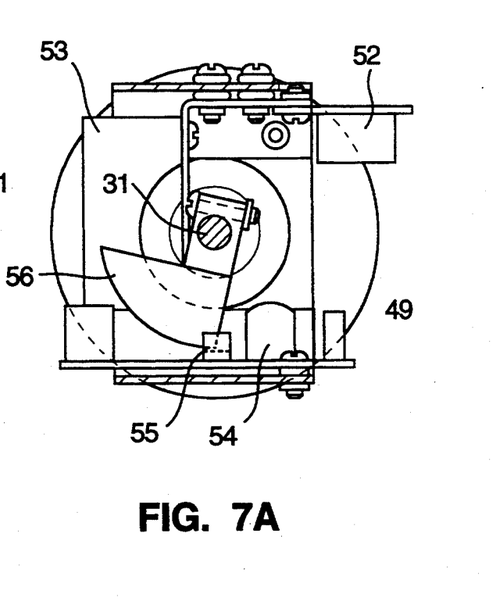
FIG. 7A is a cross-sectional end view of the level platform assembly in the direction of arrows A—A in FIG. 7B.
Figure 7B:
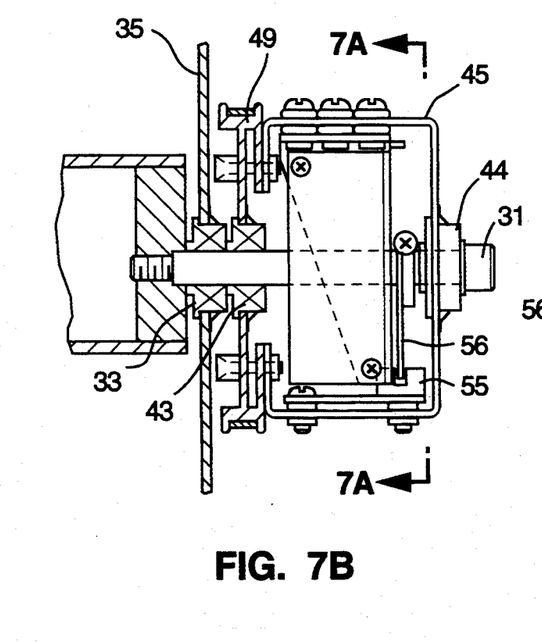
FIG. 7B is a detailed elevation view of the assembly shown at the right side of FIG. 3.
Figure 7C:
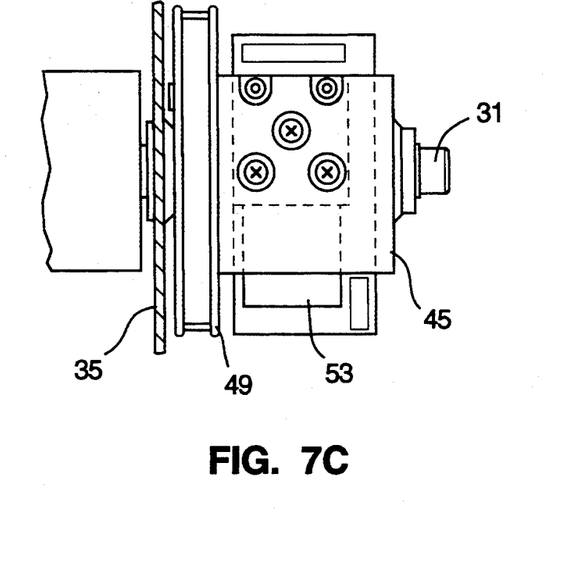
FIG. 7C is a top plan view of the assembly shown in FIG. 7B.

Referring to FIGS. 7A, 7B, and 7C level platform 45 is shown fitted with a representative set of servo stabilization system sensors consisting of a flux gate magnetic sensor 52, an angular rate sensor 53, a two-axis tilt sensor 54, and an opto-sensor 55 plus blanking quadrant 56. Installing such servo stabilization system sensors on pedestal 14, rather than locating the servo system reference means remotely, eliminates antenna pointing errors caused by hull flexure.

The Figures indicate use of a flat plate array antenna, but other antenna types, such as for example short backfire, endfire array, and parabolic reflector, can also be used with the invention herein described.

DESCRIPTION OF CONSTRUCTION CONSIDERATIONS

FIGS. 1-6 and 7A, 7B and 7C described above indicate the preferred form of the invention so as to achieve an overall compact configuration. Additionally, obtaining the other stated purposes of the invention involves satisfaction of the construction principles described below.

Referring to FIG. 2, base spindle 10 should have large mounting dimensions, should be constructed as a single rigid casting or as a weldment having multiple gussets, and should carry generous sized train bearings 7. To provide pedestal 14 with high tolerance to shock and vibration all structural members should be designed for stiffness rather than strength. Thus azimuth post 8 should be of large, tubular form in which abrupt changes in dimensions are avoided. Also, azimuth post 8 should be no taller than is necessary for antenna 2 to clear all interferences, and should be shaped so that clearance space 18 is no larger than is necessary to obtain the desired ship motion accommodation range. Level beam 22 should be as short as possible and tubular in form to obtain stiffness in all direction of static, shock, and vibration loading. Bearing pairs 7, 20, and 32/33, as shown in FIG. 4, should be pre-loaded one against the other to eliminate axial end play. Referring to FIG. 4, level platform spindle 31 should be designed for stiffness rather than strength in supporting level platform 45. Referring to FIGS. 5 and 6, elevation pans 34 and 35 should include flanged edges for stiffness and should be as short as possible, keeping in mind that the weight of antenna 2 should be counterbalanced about elevation axis 40 by means of motors 36 and 46 and additional trim weights as necessary.

DESCRIPTION OF OPERATION

In operation train motor 13, by means of pulleys 9 and 12 and drive belt 11, drives azimuth post 8 in rotation about train axis 6 at the same rate and the same amount, but in the opposite direction to turns or yaws of the ship. Changes in antenna 2 azimuth pointing direction are accomplished by superimposing additional drive commands on train motor 13. Cross-level motor 23, by means of pulleys 21 and 26 and drive belt 25, drives level beam at the same rate and the same amount, but in the opposite direction, of one orthogonal component of combined ship roll and pitch motions. Similarly, elevation motor 36, by means of pulleys 37 and 38 and drive belt 39, drives antenna 2 (through intermediate elevation pan 34) at the same rate and the same amount, but in the opposite direction, of the other orthogonal component of combined ship and roll motions. The net result of such operations is that both orthogonal components of combined roll-and-pitch, plus yaw and turning, ship motions are decoupled from the antenna, and the antenna remains pivotally motionless in three-dimensional inertial space.

Changes in antenna 2 elevation pointing direction are accomplished by simultaneously driving elevation motor 36 and level platform motor 46 the same amount, but in opposite directions.

From the foregoing description it will be apparent that there has been provided a novel and improved three-axis pedestal apparatus. While a preferred embodiment of the apparatus has been described, it will be appreciated that variations and modifications therein within the scope of the invention will become apparent to those skilled in the art. All such modification or variations coming within the scope of the appended claims are intended to be included therein. Accordingly, the foregoing description should be taken as illustrative and not in any limiting sense.

I claim:

1. A three-axis pedestal apparatus suitable for mounting on a moving structure to provide means for obtaining rotational stabilization of an object about three mutually perpendicular axes, said pedestal comprising a spindle means, the centerline of which defines a first pivot axis, and means for rigidly attaching said spindle means to said moving structure, a cantilevered structural member having one end thereof mounted for pivoting motion about said first pivot axis of said spindle, a pair of spaced apart co-axial bearings mounted on the other end of said cantilevered member so that the centerlines thereof define a second pivot axis perpendicular to and intersecting said first pivot axis, said bearings being located on said cantilevered member close to an upward extension of said first axis, a shaft mounted in said pair of bearings for pivot motion about said second pivot axis, a structural beam rigidly attached to said shaft, said beam carrying a journal at each end thereof so that the centerlines of said journals define a third pivot axis, said third axis being perpendicular to said second pivot axis and nominally intersecting said intersection point of said first and second pivot axes, and structural means mounted for pivot motion about said third pivot axis, said structural means rigidly attached to and supporting said object for orbital motion about the common intersection point of each of said first, second and third axes.

2. Apparatus in accordance with claim 1 wherein said first axis is oriented to be nominally vertical and said second and third axes lie in common horizontal plane when said moving structure is at its normal at-rest orientation, thus allowing for pointing said object independently in elevation and train coordinates without use of coordinate transformation operations.

3. Apparatus in accordance with claim 2 wherein said second and third axes accommodate the roll and pitch motions of said moving structure of at least ±50 degrees separately and collectively are accommodated for said object when pointing at any elevation angle from horizon to zenith at all train orientations.

4. Apparatus in accordance with claim 2 wherein a level platform is mounted for pivoting motion about said third axis and wherein said level platform provides mounting means for sensing gravity and other amplitude, rate, and acceleration displacements of said apparatus and actuating systems responsive to said sensing means.

5. Apparatus in accordance with claim 4 wherein drive means are provided for orienting said level platform with respect to the direction of earth's gravity.

6. Apparatus in accordance with claim 1 wherein said apparatus, including said object, occupies a small volume of orbital space for all required movements of said object to track a remote aiming point while simultaneously accommodating large amplitudes of three dimensional motion of said moving structure.

7. Apparatus in accordance with claim 6 wherein a hemispherical enclosure surrounds said apparatus including a generally flat circular object and the inner diameter of said hemispherical enclosure is not more than about 10% greater than the orbital diameter of said object.

8. Apparatus in accordance with claim 1 wherein drive means are provided for independently pivoting said cantilevered structural member about said first axis, pivoting said structural beam about said second axis, and pivoting said object about said third axis with said supporting structural means.

9. Apparatus in accordance with claim 1 wherein each of said cantilevered structural member, said structural beam, and said structural means rigidly attached to and supporting said object is counterbalanced about its respective pivot axis so as to minimize disturbing torques from external linear and tangential accelerations.

10. A three-axis pedestal comprising a base spindle rigidly attached to and oriented with its axis perpendicular to a mounting surface, said base spindle defining a train axis of rotation, an upwardly curved beam including first bearing means at its lower end for pivotally supporting said curved beam for rotation about said train axis, said curved beam including at its upper end second bearing means having a centerline perpendicularly intersecting the upward extension of said train axis to define a second axis parallel to said mounting surface, a beam cross member pivotally mounted for support by said second bearing means so as to permit said beam cross member to pivot about said second axis close to said upward extension of said train axis, said beam cross member supporting spaced apart journal means adjacent each end thereof and aligned to form a centerline of a third axis generally intersecting the point of intersection of said train axis and said second axis to define a common pivot point for the three axes, third bearing means pivotally supported by said journal means for pivotal motion about said third axis, and said third bearing means being attached to intermediate means rigidly supporting an object to be stabilized against roll, pitch and yaw/turning motions, and drive means for independently positioning each of the pivot supports for said curved beam, said beam cross member and said object support means in response to deviations of said object from a preselected attitude to control continuously thereby the position of said object relative to a remote aiming point.

11. In a pedestal for supporting an object to track a preselectable aiming point in space from a mobile platform subject to angular displacements including turn-/yaw, pitch and roll motions, said pedestal including means for detecting and measuring the direction and extent of such angular displacements of said supported object during tracking of said preselectable aiming point in space, and drive means for continuously correcting the angular aiming point of said pedestal to substantially coincide with said preselected aiming point by pivoting said object about a plurality of axes in response to said angular displacements of said object relative to said mobile platform, the improvement wherein said pedestal comprises an azimuth table supportable for rotation about a centerline generally perpendicular to said mobile platform to form a train axis extending vertically upward from said mobile platform, an azimuth post having its lower end extending upwardly from said azimuth table at a position radially displaced from said train axis and the upper end thereof being cantilevered radially inwardly to generally overlie said train axis, a cross-level structure supported on said upper end of said azimuth post for pivotal rotation around a cross-level axis lying in a plane perpendicular to and closely intersecting said train axis, and the ends of said cross level structure being nominally equidistant from said cross-level axis, an elevation structure including means for pivotally supporting said elevation structure on said cross-level structure for rotation about an elevation axis extending along said cross level structure and perpendicular to said cross-level axis and said train axis so that said elevation axis substantially intersects said cross-level axis and said train axis at a common intersection point and means for supporting said object on said elevation structure so that said object orbits about said common intersection point during angular movement of each of the respective support means about said train, cross-level and elevation axes.

* * * * *